United States Patent [19]

Ragsdale

[11] 3,742,360

[45] June 26, 1973

[54] AUTOMATIC EQUALIZER CIRCUIT

[75] Inventor: Robert G. Ragsdale, Hollywood, Fla.

[73] Assignee: Milgo Electronic Corporation, Miami, Fla.

[22] Filed: Nov. 18, 1969

[21] Appl. No.: 877,676

[52] U.S. Cl. .................. 325/42, 325/65, 328/15 S, 333/18 R

[51] Int. Cl. .......................................... H03h 7/36

[58] Field of Search......................... 325/42, 65, 30; 333/18, 28 R; 178/66, 67, 69 B, 88; 179/15 AE, 15 BL, 15 FD, 170 D, 150; 330/22, 29, 127, 130, 134, 142; 328/155

[56] References Cited

UNITED STATES PATENTS

| | | | |
|---|---|---|---|
| 2,465,531 | 3/1949 | Green | 325/65 X |
| 3,550,005 | 12/1970 | Whang | 325/42 X |
| 3,414,845 | 12/1968 | Lucky | 333/18 |
| 3,071,739 | 1/1963 | Runyon | 333/18 |
| 3,324,251 | 6/1967 | Sichak et al. | 333/18 X |
| 3,335,223 | 8/1967 | Johannesson et al. | 325/42 UX |
| 3,444,468 | 5/1969 | Drouilhet, Jr. et al. | 333/18 X |

*Primary Examiner*—Benedict V. Safourek
*Attorney*—Jackson & Jones

[57] ABSTRACT

An automatic equalizer circuit for use in data transmission systems is disclosed. A transmitter includes a signal generator for generating and transmitting test patterns over a narrow bandpass-limited communication link. An automatic equalization circuit is connected at a receiver station and includes a plurality of amplitude and delay sections at selected frequencies, which sections are variable in response to electrical control signals. A test pattern under ideal amplitude and delay characteristics for the link exhibits an analog shape that is predictable. For a given amplitude and delay setting in the equalizer sections, the received test signal is sampled and counted down automatically to a predetermined level. The number of counts required to reduce the sample to the predetermined level is accumulated for a series of samples, and then the number of counts for another series of samples is also accumulated, for comparison with the previous accumulation. The compared accumulations are responded to by a control circuit which varies 1 amplitude and/or delay section in the proper direction to quickly achieve equalization. A program sequencer addresses all sections as many times as necessary and in a proper order to achieve the ideal delay and amplitude settings for effective equalization of the communication link.

15 Claims, 9 Drawing Figures

INVENTOR.
ROBERT G. RAGSDALE
BY Jackson & Jones
ATTORNEYS

AUTOMATIC EQUALIZER CIRCUIT

CROSS REFERENCE TO RELATED APPLICATIONS

The automatic equalizer of this invention is an improvement over the manual equalizer entitled "Equalization Circuit" filed Mar. 1, 1968 having Ser. No. 709,608 now U.S. Pat. No. 3,550,005 assigned to the same assignee as the present application.

BACKGROUND OF THE INVENTION

1. Field of the Invention

Automatic equalization includes widespread uses in communication links having widely different amplitude and delay characteristics. Typical examples include commercial, military and foreign unconditioned voice-grade telephone lines.

2. Description of the Prior Art

Variable equalization is known to the prior art and both manual and automatic equalization systems exist. In all equalization systems a communication link is customized so that its amplitude and delay characteristics of the link and the equalization circuit is relatively constant for a wide band of frequencies.

The other patent application referenced to hereinbefore and the additional applications referred to therein disclose a new communication link concept wherein a narrow band system is employed. Such a narrow band system requires a minimum number of variable delay and amplitude sections in order to achieve proper equalization for the communication link. Thus, many prior art systems required, as a typical example, up to 14 amplitude and delay sections to achieve equalization. The narrow band communication link of the referenced patent application achieves adequate equalization by less than half the amplitude and delay sections required of the prior art.

It has been general practice in the prior art to equalize a communication link through what is commercially referred to as time-domain adjustments. In such time-domain equalizers, a delay line includes a plurality of weighted taps which weights are automatically variable. A known signal shape is received over a communication link and is supplied to the delay line. This signal shape is repeated in time by the delay line so that a number of echos are established at the outputs of the delay. The delay outputs are summed together with various settings selected to develop a signal shape which closely resembles the ideal signal shape that is desired.

The equalizer of the present invention operates in the frequency domain in that each section is assigned a center frequency. The amplitude and delay characteristics for that section are variable about that center frequency. A plurality of these sections are variably adjustable to provide a constant amplitude and constant delay over the narrow band of the communication link.

SUMMARY OF THE INVENTION

A frequency-domain equalizer comprises a plurality of amplitude and delay sections having assigned center frequencies evenly spaced across the bandwidth of a narrow-band communication link. Each amplitude and each delay section has a plurality of settings which vary the amplitude and delay characteristics about its center frequency. The variable settings within a given section are electrically controlled by signals appearing at the output terminals of a counter associated with each section. A control circuit samples test pattern signals received over the link and passed through all of the delay and amplitude sections. The sampling stores the amplitude of signal portions located at predetermined intervals of the received test pattern signal. A stored amplitude is automatically counted down and the number of counts necessary to reduce the amplitude to a predetermined level is stored in an accumulator circuit. Several samples and countdowns occur during a test frame. After one test frame is completed a counter advances the section in question to a new setting, and the sample and countdown operation is repeated for the next test frame. A second countdown value is accumulated and a comparison circuit compares the two accumulations. The direction of the counter is controlled so that a minimum amplitude setting is achieved. A program sequencer is available to sequence the various amplitude and delay sections for the sample and countdown operations. When a minimum number of counts is accumulated for all of the sections at a given setting for all sections, the line is automatically equalized.

BRIEF DESCRIPTION OF THE DRAWING

The foregoing features and objects of this invention may be more fully appreciated by reference to the accompanying drawing in which:

FIG. 7 is a waveform chart showing variable delay and amplitude characteristics in accordance with the principles of this invention.

DESCRIPTION OF THE PREFERRED EMBODIMENT

Figure 1:
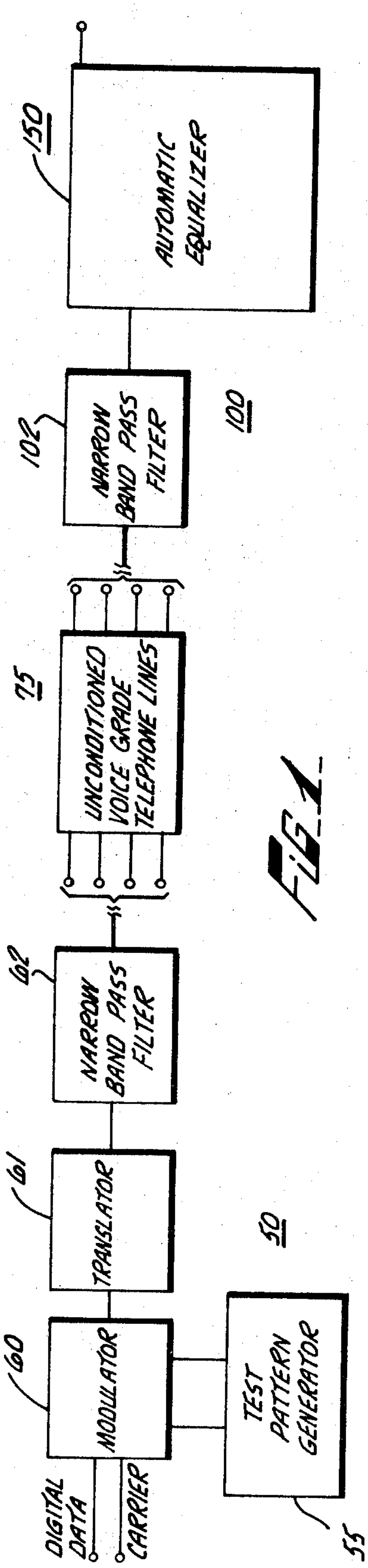
FIG. 1 is a block diagram of a transmitter, a communication link and a receiver.

Turning now to the drawing of FIG. 1, there is illustrated a transmitter location 50 which is connected to a communication link 75. The communication link may, as a typical example, include a plurality of unconditioned voice-grade telephone lines. A receiver station 100 is connected at the receiver end of the communication link 75. Digital data to be transmitted over the communication link is received at the modulator 60. The digital data modulates a carrier by establishing differential phase angles from one modulation period to the next.

To transmit data at acceptable error rates, the communication link 75 must be properly equalized. During equalization, the digital data is inhibited and a test pattern generator 55 supplies test frames each having several different signal sequences to the modulator 60. These test signals are transmitted, received, and utilized for automatic equalization of the communication link 75 in a manner more fully described hereinafter.

Irrespective of whether data or test signals are being transmitted, the transmitter 50 employs a translator circuit 61. Circuit 61 translates the low frequency carrier signal to a high frequency envelope which improves the overall system operation. Connected to the output of circuit 61 is a narrow bandpass filter 62. The narrow bandpass filter is fully described in the previous application and the applications referred to therein. Briefly, however, filter 62 in conjunction with the communication link 75 and an additional narrow bandpass filter 102 at the receiver location serve to define a linear phase narrow bandwidth system. The narrow passband is defined by the equation (1/T) $H_z$ with a center frequency at $f_o$, the carrier frequency, and a modulation period of T. As typical examples, the carrier frequency, $f_o$, may be 1,700 $H_z$ for transmission of either 2,400 bits per second, or 4,800 bits per second. The bandwidth will be less than 1,000 $H_z$ for 2,400 bits per second, and it will normally be in the order of 1,600 $H_z$ for 4,800 bits per second. The narrow bandwidth for the two typical given examples is thus approximately 1,300 $H_z$ to 2,100 $H_z$ for 2,400 bits per second or 900 $H_z$ to 2,500 $H_z$ for 4,800 bits per second. Such a narrow bandwidth requires a lesser number of amplitude and frequency settings to obtain equalization than do prior art broadband systems. In addition, the narrow bandwidth system has a highly predictable envelope shape for given test patterns. This predictability in signal shape thus readily provides sample points for determining the effectiveness of the automatic equalizing operation.

Figure 1A:
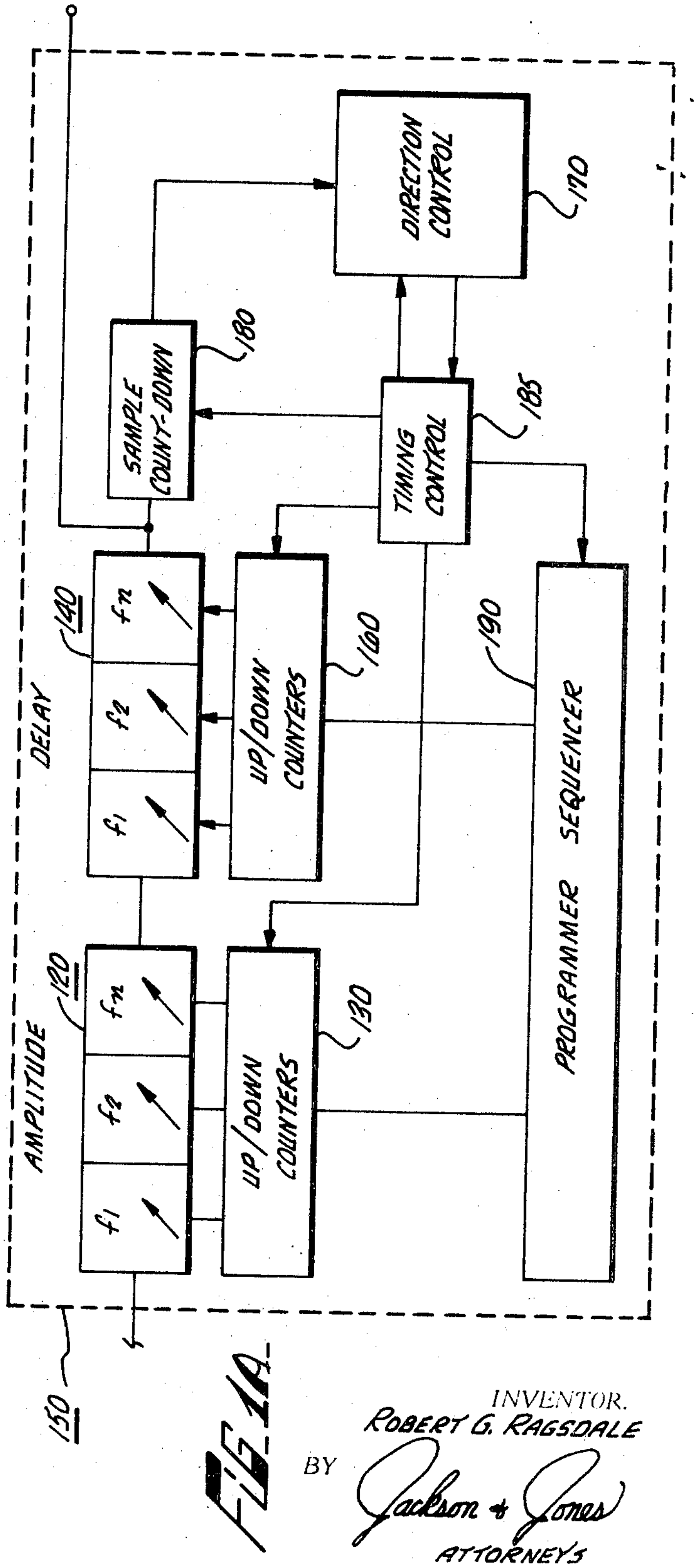
FIG. 1A is a block diagram of an automatic equalizer incorporating the principles of this invention.

Automatic equalizer 150, FIG. 1A, comprises a plurality of variable sections 120 and 140. As shown in each section, the amplitude and delays are variable around an assigned center frequency $f_1$, $f_2$---$f_n$. As an example of typical frequency assignments, one amplitude and one delay section is assigned a center frequency slightly lower than the lower bandwidth limit for the system. Another amplitude and another delay section is assigned a center frequency slightly higher than the upper bandwidth limit for the system. An additional amplitude and an additional delay section is assigned a center frequency corresponding to the center frequency of the system. A pair of amplitude and delay sections are each assigned center frequencies which are intermediate the system's center frequency and its upper and lower frequency limits.

A plurality of UP/DOWN counters 130,160, FIG. 1A, are associated with the amplitude and delay sections 120, 140, respectively. These UP/DOWN counters each comprise a plurality of stages typical to any well-known binary counters. Each individual counter is provided with several outputs which are arbitrarily designated binary values $2^{-1}$, $2^{-2}$, $2^{-3}$, $2^{-4}$, $2^{-5}$, $2^{-6}$, $2^{-7}$, etc. A timing control circuit 185 advances or retards the count in counters 130, 160. As the output signals vary in the individual counters 130, the gain is selectively varied in the amplitude section controlled by that counter. In a similar manner as the output levels from the individual counters 160 vary, the effectiveness of tuned circuits within the delay sections 140 controlled by those counters is varied. A program sequencer 190 selects certain UP/DOWN counters 130, 160 in a series of sequences. The direction of count within the selected counter is determined by output signals from the direction control 170. Thus, a selected counter is advanced or reversed in response to outputs from a direction control circuit 170.

Due to the narrow bandwidth of the system any signal passing through the amplitude and delay sections 120 and 140 for a given setting therein, should have a minimum amplitude at certain predicted signal locations. Samples are obtained at these predicted locations by a sample and countdown circuit 180. Such samples are diminished, or counted down, by a series of precisely metered amounts. Signals representative of the countdown operation are received and stored in the direction control 170. Direction control 170 correlates the countdown relative to one another and emits signals to timing control 185 so that additional equalization is quickly and readily obtained.

Figure 2:
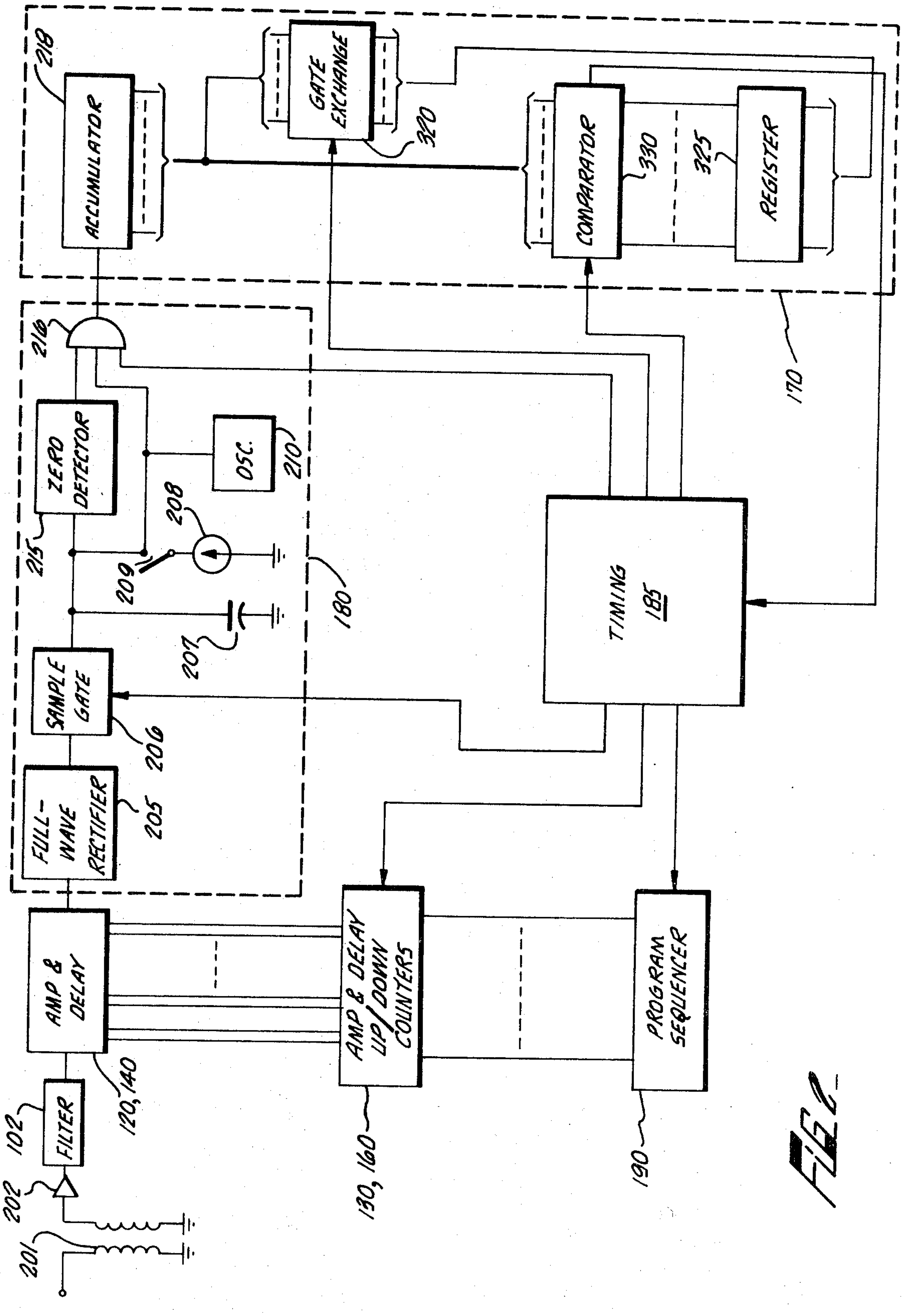
FIG. 2 is a more detailed block diagram of the automatic equalizer incorporating the principles of this invention.

Turning now to FIG. 2, transformer 201 terminates a communication link 75, FIG. 1. Amplifier 202 applies a translated signal, received over the link by transformer 201, to a narrow bandpass filter circuit 102. Connected to the output of filter 102 is the plurality of amplitude and delay sections 120, 140. It should be understood that these sections will initially be established with a given setting which may be either predetermined or random. A signal received over the communication link is amplified, filtered and passed through the variable amplitudes and delay sections. Such a signal is then full wave rectified by rectifier 205 which forms part of the sample and countdown circuit 180 shown in dashed lines in FIG. 2.

Figure 3:
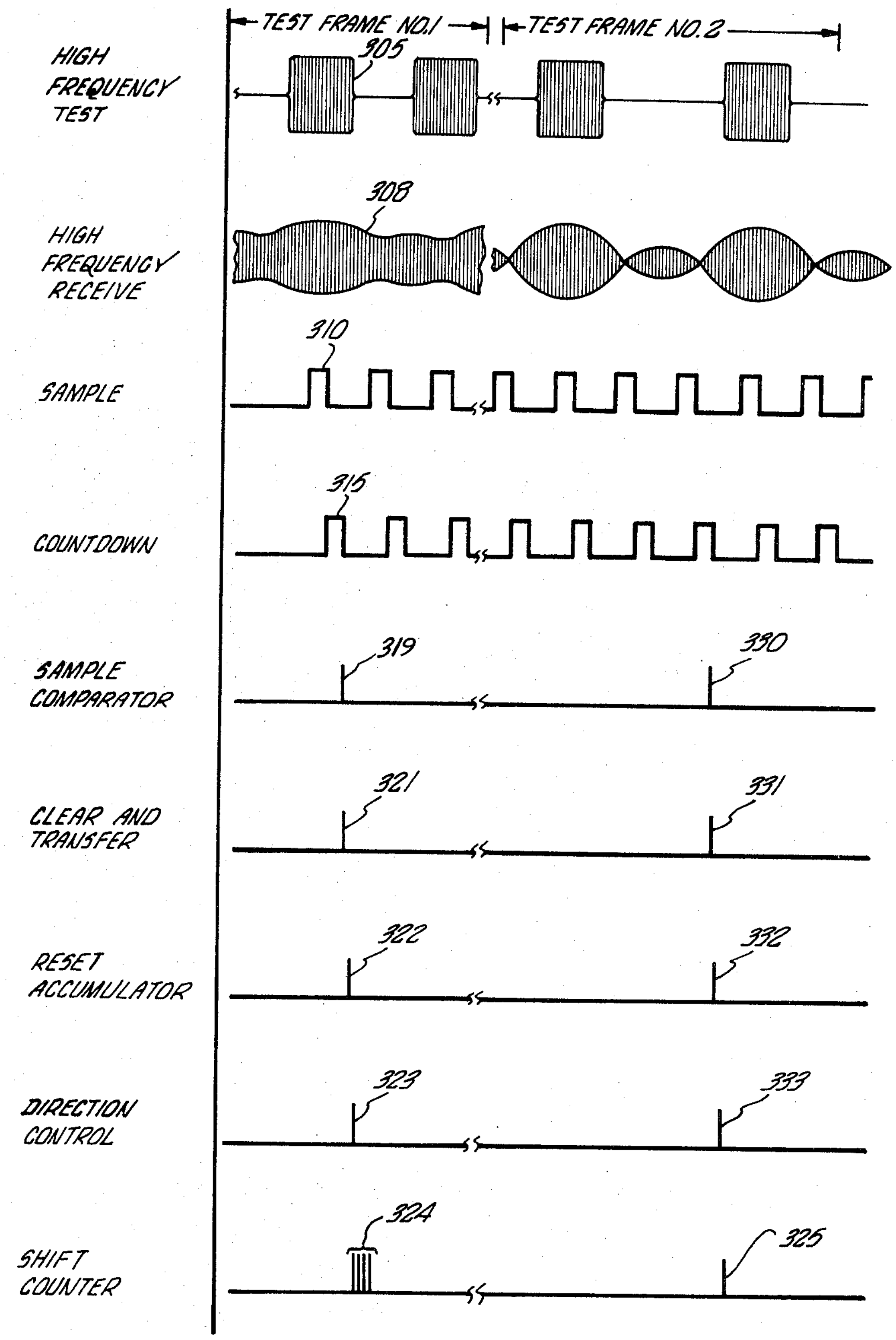
FIG. 3 is a pulse and waveform chart useful in promoting a clear understanding of the principles of FIGS. 1 and 2.

Reference to FIG. 3 is proper at this moment to appreciate one particular test signal 305. A test signal includes several test frames. A given signal format is the same within a given test frame, but is different from one test frame to the next. For example, for Frame No. 1, a high frequency square-wave signal is bracketed by a pair of blanked modulation intervals. In test Frame No. 2 a high frequency square-wave signal is bracketed by two blanked modulation intervals on each side thereof. The various signal formats within the test frame provide a wide frequency spectrum which assures a full and complete test of the system during the equalization operation.

When received over an equalized band-limited communication link, the test signal 305 should exhibit the analog shape substantially as shown by waveform 308 in FIG. 3. Thus, in a narrow bandwidth communication link of this invention, the signal 308 has a peaked amplitude at the center of its modulation interval and it drops toward ZERO at the middle of the adjacent modulation intervals as depicted in FIG. 3. For a signal format such as test Frame No. 2, the received test signal will drop substantially to ZERO.

Inasmuch as the received analog shape is predictable for an equalized line, it serves as a reference for the automatic equalizer principles of this invention. Accordingly, a plurality of sample pulses 310 are utilized to sample a portion of the received test signal at the middle of each modulation interval. Thereafter, as shown in FIG. 3, a plurality of countdown intervals 315 are utilized to reduce the sampled amplitude by precisely metered amounts.

Figure 4:
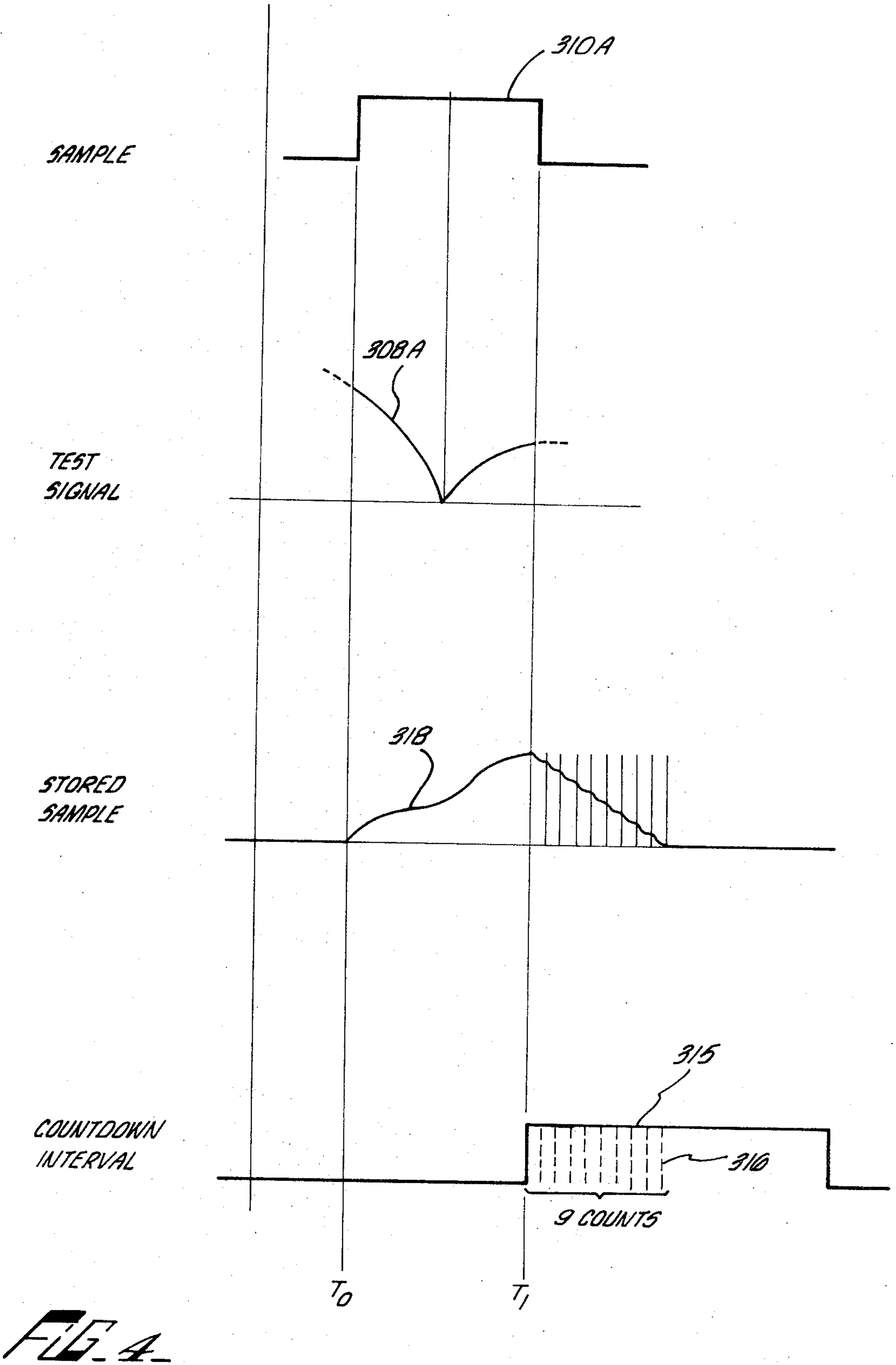
FIG. 4 is an additional pulse and waveform chart useful in promoting a clear understanding of the sample and countdown operation utilized in the principles of this invention.

Reference to FIG. 4 shows, in expanded time scale, a given sample pulse 310A which brackets a portion 308A of a full wave rectified envelope from a received test signal. During sample time $T_0$ through $T_1$ sample gate 206, FIG. 2, is enabled. Enabled sample gate 206 applies the full wave rectified signal 308A to a storage capacitor 207, FIG. 2. The signal stored in storage capacitor 207 during time $T_0$ through $T_1$, is shown as waveform 318 in FIG. 4.

Connected to the storage capacitor 207, FIG. 2, is a switch controlled current source 208. An oscillator circuit 210 repeatedly opens and closes switch 209 for precisely controlled time increments. Current source 208 is poled in opposition to the charge stored in capacitor 207. Thus, each closure of switch 209 reduces the stored signal 318, FIG. 4, by metered amounts. Reference to FIG. 4 shows that nine closures of switch 209 are needed to reduce signal 318 to ZERO. A detector 215, FIG. 2, monitors the signal present in capacitor 207. Circuit 215 may be any well known detector such as a ZERO detector. A ZERO detector emits an enabling output signal to gate 216 until the stored value in capacitor 207 has reached a predetermined level such as ZERO. ZERO detector 215 thereafter delivers an inhibit level to gate 216. Gate 216 has applied to its other input terminals, an output signal from oscillator 210, and a countdown signal 315 which is also shown in expanded time in FIG. 4. Operation of gate 216 as just described, allows the oscillator pulses (shown dashed as pulses 316, FIG. 4) to be gated from oscillator 210 into accumulator circuit 218 during countdown interval 315, FIG. 4. As soon as the value of the signal stored on capacitor 296 reaches ZERO of course, the oscillator pulses from oscillator 210 are inhibited from reaching accumulator 218 by the inhibit level applied to gate 216 by detector 215.

By reference now to FIG. 3 it can be seen that each sample pulses 310 brackets a portion of received test signal 308. These samples pulses occur either at an expected minimum amplitude or at an expected maximum amplitude. Samples obtained at a peaked or maximum amplitude portion of the received test signal 308, are handled in a slightly different manner than those obtained at minimum amplitudes. Circuit values for capacitor 207 and source 208 are adjusted so that the signal stored in capacitor 207 for maximum amplitude samples saturate the countdown capability of the circuit during each countdown interval 315. Accordingly, the circuit counts a predetermined number of counts during every countdown interval which follows a maximum amplitude sample. Since these peaked amplitudes are present for every series of signals during each test frame they cancel out as far as the accumulator comparison is concerned.

For purposes of a more detailed explanation of FIG. 2, assume that 80 separate samples are present for each test frame. The 80 samples are held and counted down in the manner just described such that a given count for that test frame is stored in accumulator 218, FIG. 2. An output signal 320, FIG. 3, then enables comparator 330 to compare the count in accumulator 218 with the count in register 325. Register 325 has stored therein the count accumulated as a result of the series of samples from a previous test frame. Immediately after a comparison is accomplished, a clear and transfer pulse 321, FIG. 3, is applied to gate exchange 320 from timing control 185, FIG. 2. Gate exchange 320 clears register 325 and transfers the count from accumulator 318 into storage register 325. Accumulator 218 is then reset by a reset pulse 322, FIG. 3. A direction control pulse 323 may under certain circumstances thereafter be emitted from timing control 185. A direction control pulse will be emitted only if the count for the particular section being varied increases relative to a previous count. Since the accumulations from two test frames are related to a summation of the minimum amplitude portions for the signal received during the test frames, any increase indicates that the section is being varied in the wrong direction. Normally, it is desirable to obtain at least two increases before changing directions. This procedure will help guard against spurious noise signals adversely affecting the sample and countdown operation by indicating a wrong direction when, in fact, the direction being pursued is proper.

At early stages of equalization, the binary number stored in stages of the selected counter may be advanced or reversed by several binary digits. Thus, as shown in FIG. 3, four shift pulses 324 are applied to the selected counter to change the binary number by four digits. Such multiple shifting of the selected counter represents a coarse adjustment for the automatic equalizer 150. As the degree of equalization improves, the binary number stored in the stages of the selected counter is advanced or reversed by only one binary digit at a time, Such a shift, representing a fine adjustment, is depicted by a single shift pulse 325, FIG. 3.

Figure 5:
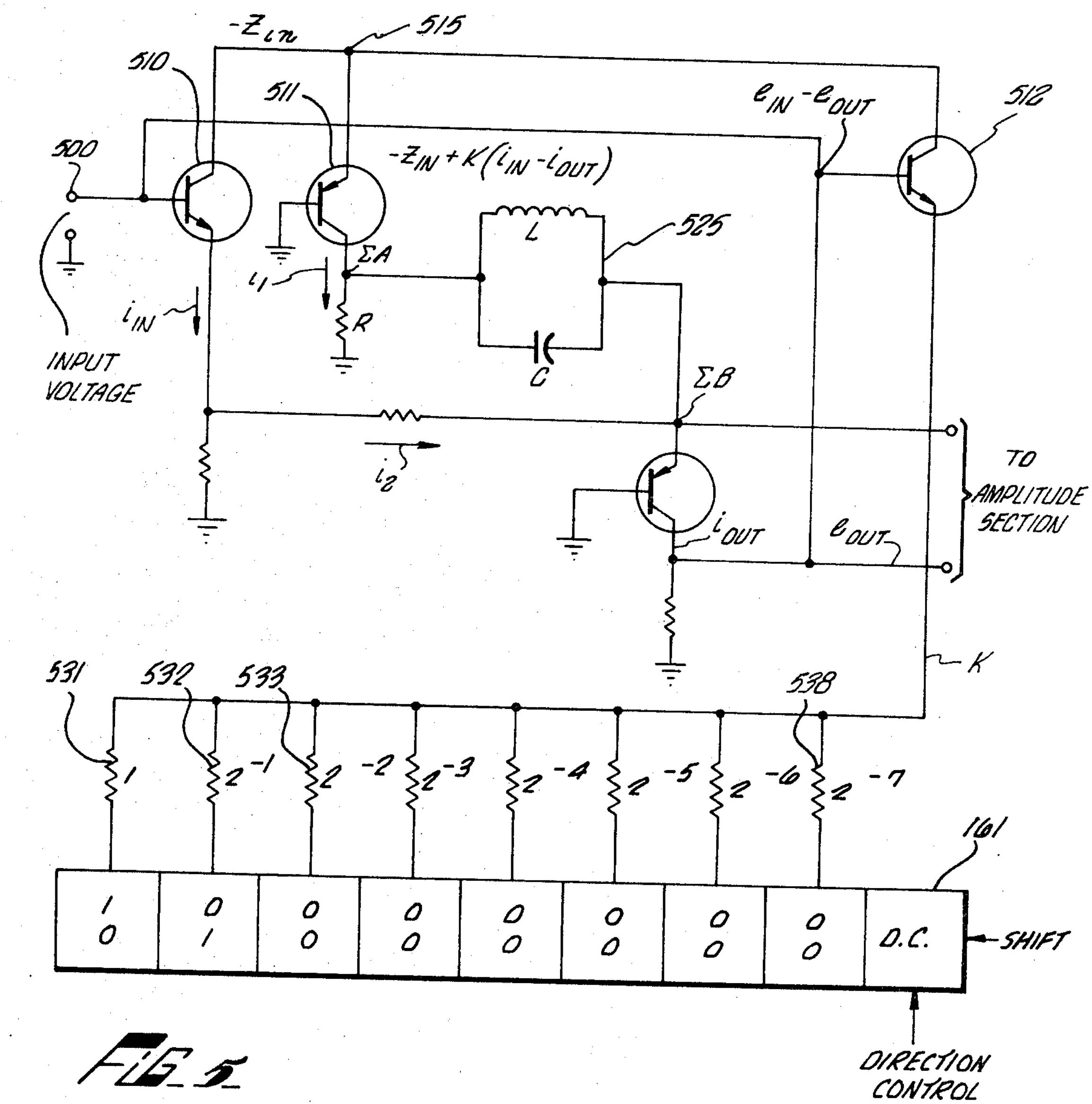
FIG. 5 is a detailed circuit schematic and block diagram of a typical delay section.
Figure 6:
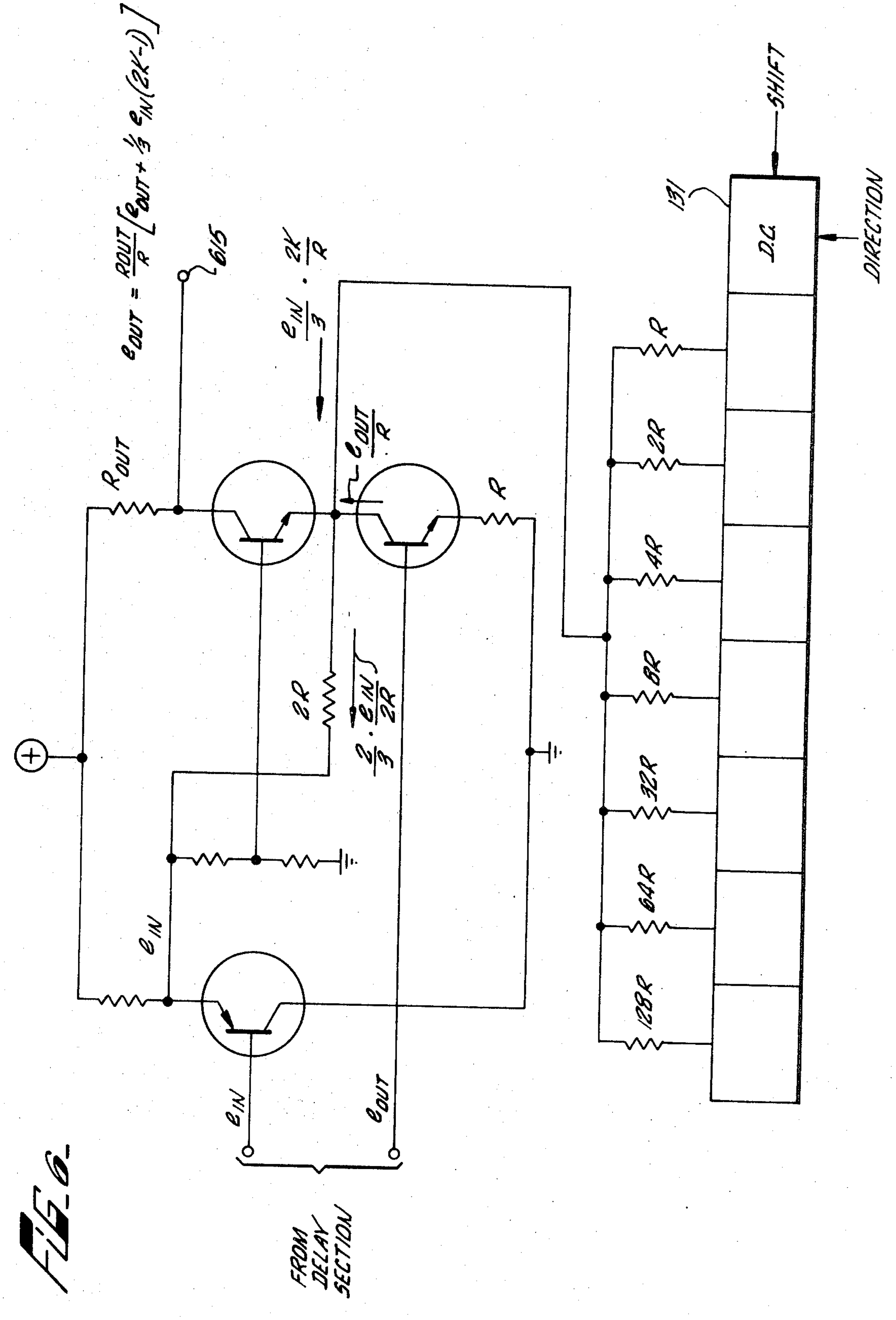
FIG. 6 is a detailed schematic and block diagram of a typical amplitude section.
Figure 1:
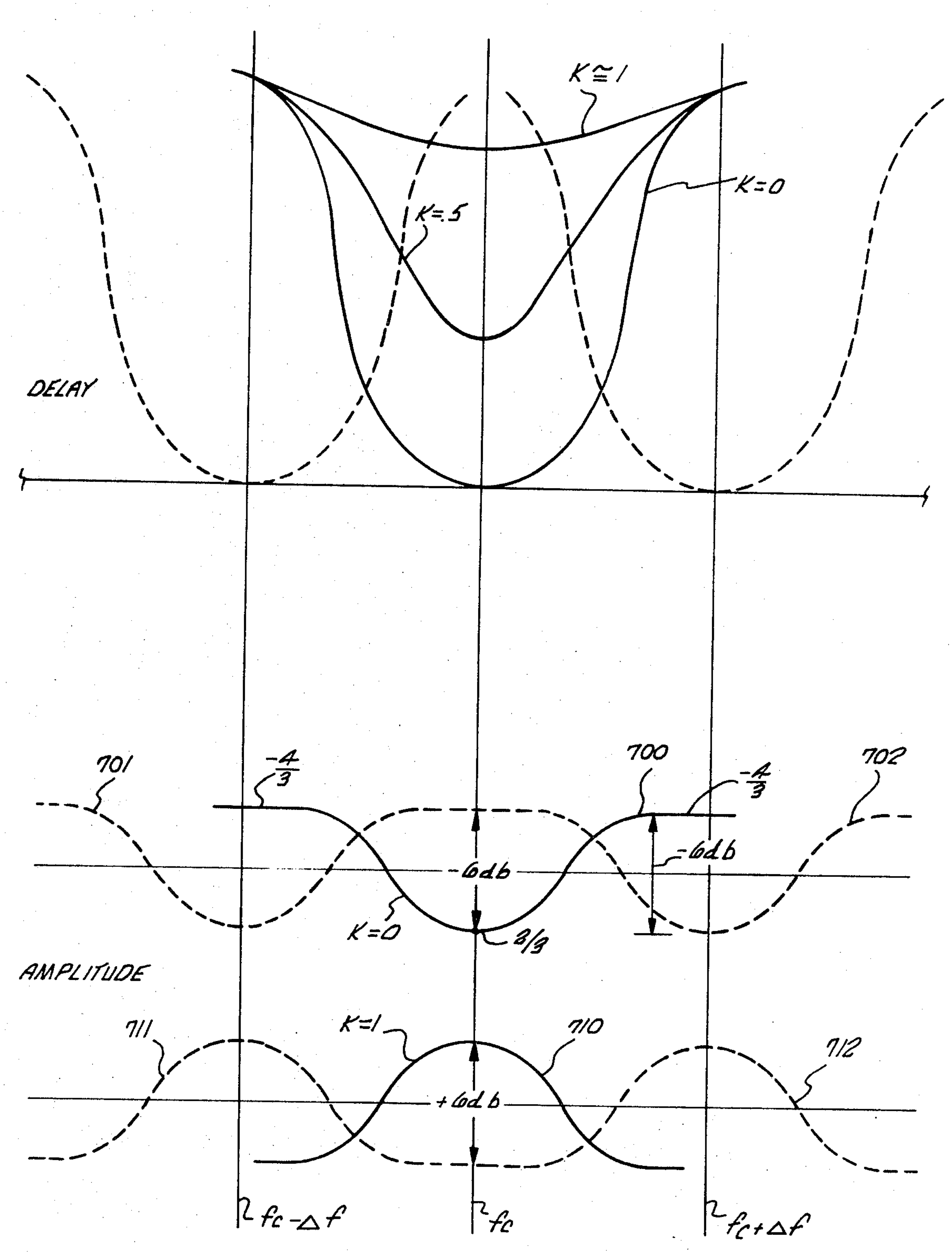

Reference will now be made to FIGS. 5, 6, and 7 in order to clarify the manner in which delay and amplitude is automatically adjusted. For simplicity purposes a delay section will be discussed independently of an amplitude section. It should be understood, however, that these two sections are, in fact, interrelated as to their effect on a signal passing therethrough. Thus, a change in amplitude varies the center frequency slightly. Variations of the center frequency, of necessary, varies the delay to a certain amount. Stated another way, an amplitude adjustment changes the phase characteristic of the signal that is passed by an amplitude section, and since delay is a derivative of the phase characteristic of the signal entering the delay section, the delay must change slightly with each amplitude adjustment. In any event, the desired adjustments yield for an equalized line a composite electrical characteristic that has a flat amplitude and a flat delay characteristic over a frequency range which is slightly in excess of the narrow bandwidth employed in this invention.

A typical delay section which is variable automatically in response to a binary number stored in a counter circuit is depicted in FIG. 5. It should be understood that this delay section of FIG. 5 is one only of several delay sections that are required to cover the frequency band of interest. As described earlier, a narrow bandwidth system of this invention typically utilizes five separate delay sections. Accordingly, five separate binary counters each automatically varying envelope delay within five associated delay sections are utilized.

Delay characteristic curves for three delay sections are shown in FIG. 7. Each delay section (such as that of FIG. 5) includes an RL tuned circuit, which is tuned to a center frequency. One center frequency $f_c$, FIG. 7, may, for example, be the center frequency of the bandwidth of the communication system. Spaced on each side of that center frequency $f_c$, FIG. 7, are other center frequencies for tuned circuits of two other delay sections similar to the delay section shown in FIG. 5.

In FIG. 7, the solid waveform varying about the center frequency $f_c$ illustrates different degrees of effectiveness for the RL tuned circuit assigned to the center frequency $f_c$. Three solid waveforms are shown at $f_c$, however, a typical delay section will have as many variations in the degree of effectiveness of the section's tuned circuit as there are stages in the counter controlling the delay. Each degree of effectiveness is identified, in FIG. 7, by a constant K, which constant is established in a manner more fully described hereafter.

Figure 5A:
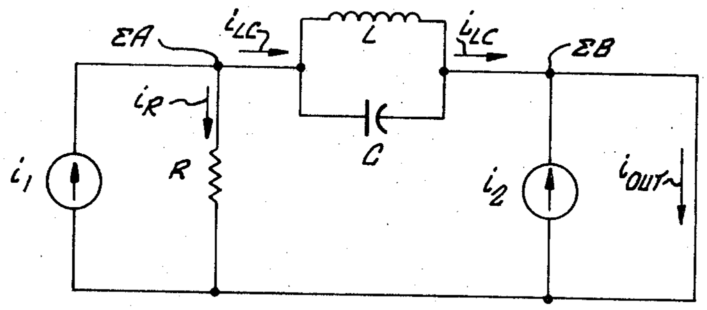
FIG. 5A is a simplified circuit useful in deriving equations for parameters in the circuit of FIG. 5.

In order to more fully understand the significance of the constant K and its counter-controlled value, reference is now made to FIG. 5A. FIG. 5A is a simplified schematic of FIG. 5 and it provides a ready basis for understanding the equations that determine the degree of effectiveness for the tuned circuit of any delay section.

For the currents, resistances and RL tuned circuit parameters of FIG. 5A the following equations may be written:

$$i_1 = i_R + i_{LC} \quad (1)$$

$$i_{out} = i_2 + i_{LC} \quad (2)$$

$$i_R R = i_{LC} [jwL/1 - w^2LC] \quad (3)$$

$$4. \quad i_1 = i_{LC}\left[1+\frac{jwL}{1-w^2LC}\right] = i_{LC}\,\frac{1-w^2LC+jwL/R}{1-w^2LC}$$

$$i_{out} = i_1\,(1-w^2LC/1-w^2LC+jwL/R) + i_2 \quad (5)$$

$$[(i_1+i_2) - i_{out}]\,(1-w^2LC) + (i_2 - i_{out})\,jwL/R = 0 \quad (6)$$

Set:
$i_1 = Z\,i_{in} - K\,(i_{in} - i_{out})$
Since:
$i_2 = i_{in}$
Therefore:

$$(i_{in} - i_{out})\,(1-K)\,(1-W^2LC) - (i_{in} + i_{out})\,jwL/R = 0 \quad (7)$$

$$8. \quad \frac{i_{out}}{i_{in}} = \frac{(1-K)(1-w^2LC)-jwL/R}{(1-K)(1-w^2LC)+jwL/R}$$

$$\text{AT } w^2 = 1/LC \text{ Delay} = -4\,RC\,(1-K) \quad (9)$$

The values for K vary from 1 to 1/128 as typical amounts. These values are depicted at the output resistors 531 through 538 of counter 161 in FIG. 5. FIG. 5 also includes currents and voltages in the above equations set out at their appropriate circuit locations. An input voltage which is to be equalized is received at a terminal 500, FIG. 5. That input voltage is amplified by a grounded emitter transistor 510. Transistor 510 presents an impedance to the emitter of transistor 511 which impedance has the value $-Z_{in}$. Terminal 515 is a summation point for $-Z_{in}$ and one other value. The other term applied to terminal 515 is related to the constant K as that constant is applied to the emitter of a transistor 512.

The various stages of counter 161 during an equalizer operation include either a ZERO or a ONE. A ONE in any given stage connects the output resistor of that stage to ground so as to establish transistor 512 in a grounded emitter configuration. Binary weighted values for resistors 531 through 538 control the effectiveness of the LC tuned circuit 525 in accordance with equation No. 9 above. Two typical binary numbers are shown in counter 161. In the first number the left-hand stage includes a ONE and ZEROS are stored in the remaining stages. A ONE in the first stage grounds the emitter of transistor 512 through resistor 531. Resistor 531 has a value designated as 1 and thus presents a very minor amount of envelope delay, as shown for K approximately equal to 1 in FIG. 7. Thus, for the binary number 1000000 the effect of the tuned circuit 525, FIG. 5, is negligible on a signal passing through the delay section. Another typical binary number as shown in the second row within the stages of counter 161, grounds resistor 532. Resistor 532 establishes a value of 0.5 for the constant K. Reference to FIG. 7 shows that the effectiveness of the tuned circuit 525 is increased significantly for this binary number 01000000. For the two examples just given, the envelope delay ($K$=0.5) may be in the order of 800 microseconds as compared to approximately 100 microseconds delay when K is approximately 1. The right-hand stage of counter 131 is a direction control stage. This stage, in a well-known manner, gates the shift pulses applied to counter 161 in a proper direction to store ONES within counter 161. Binary digits within counter 161 move either forward or backward in a well-known manner depending upon the state of the direction control stage. The state for the direction control stage as described earlier is determined by signals applied thereto by timing circuit 185.

It was mentioned hereinbefore that particular sequences for a given section may involve a single shift pulse at the shift terminal or it may involve several shift pulses. The shifting sequences, of course, may vary from application to application. I have found, however, that the amount of time required to achieve equalization may be significantly reduced by first utilizing a series of coarse adjustments for a given direction as obtained by, say, four shift pulses. Four shift pulses in counter 161 establishes four stages therein in ONE states. A sample and comparison operation as described earlier takes place after each binary number change. If the comparison is greater then a signal is applied to the direction control stage and four shift pulses in the reverse direction are stored in counter 161. Assuming that after the second sample the direction being pursued is proper, shifting will continue in that direction until such point in time that a comparison yields a greater count in which event the direction control stage again reverses the direction of shifting in counter 161. After the second reversal I have found advantages in using only a single shift pulse, to obtain a final adjustment for the given delay stage.

Connected to the output terminals of the delay section of FIG. 5, is an amplitude section of FIG. 6. Associated with the amplitude section of FIG. 6 is a counter 131 which operates in the same manner as that described hereinbefore with the counter 161 of FIG. 5.

The delay section of FIG. 5 was referred to as a binary-controlled envelope delay section. In a similar manner the amplitude section of FIG. 6 is a binary gain amplifier. Numerous binary gain amplifiers are available; however, the one depicted in FIG. 6 is particularly applicable to the desired characteristics for this invention. Certain parameters have been established in FIG. 6 along with the associated equations defining the currents and voltages present at circuit locations in the binary gain amplifier. The equations referenced to circuit locations in FIG. 6 are self-explanatory. As shown at output terminal 615 the output voltage from the amplifier section includes a term $2K=1$. The constant K for the amplitude section is again obtained from weighted resistors which are either grounded or open circuited by binary ONES stored in counter 131.

By way of further definition, the amplifier parameters, in a well-known manner, are selected so that at the assigned center frequency for the amplifier the output voltage $e_{out}$ is equal to the input voltage $e_{in}$. At frequencies considerably removed from that center frequency, such as the outer frequency limits for a given amplifier section, the output voltage $e_{out}$ is equal to the inverse of the input voltage, $-e_{in}$. This predetermined voltage relationship over the frequency limits for each amplifier section may be substituted into the output equation for the amplifier section of FIG. 6, at various values of the constant K. Such substitutions yield a family of amplitude curves that exist between the two extremes shown by solid waveforms 700 and 710 at frequency $f_c$, FIG. 7. Of course, similar families of curves exist at each frequency assigned as the center frequency for other amplitude sections. Such other curves 701, 711 and 702, 712 are shown dashed in FIG. 7. A plurality of such amplitude sections, thus extend over the entire frequency spectrum of the link to be equalized. Various settings for individual sections can thus achieve the desired flat amplitude in the same manner as is true for the delay sections described hereinbefore.

Reference again is made to the center frequency $f_c$ of FIG. 7 and to the output equation shown in FIG. 6. At the center frequency $f_c$ assume a value of K of ZERO. When K is ZERO at $f_c$ output voltage $e_O$ is equal to ⅔ the input voltage times a ratio of $R_{out}/_R$. This may be shown by recalling that by definition at $f_c$, $e_{out}$ is equal to $e_{in}$ and may be substituted into the output equation. Accordingly at $f_c$ with K=ZERO, $$E = R_{out}/R\ [e_{in} - \tfrac{1}{3}\, e_{in}] = R_{out}/R \cdot \tfrac{2}{3}\, e_{in}$$

This value is depicted by amplitude waveform 700 in FIG. 7. Also by definition at the outer frequency limits for a given amplitude section $e_{out}$ is equal to $e_{in}$. Again assuming a value for K of ZERO, it may be shown that the output voltage is 4/3 the input voltage times a ratio of $R_{out}/R$ as shown:

$$E = R_{out}\ [e_{in} - \tfrac{1}{3}\, e_{in}] = WR_{out}/R \cdot \tfrac{2}{3}\, e_{in}$$

Assuming a value for K of 1 and substituting into the output equation for the amplifier of FIG. 6, an output waveform 710, FIG. 7, is obtained. The amplitude variation at $f_c$ represents a plus or minus 6 decibel gain, as shown at curves 700 and 710 respectively. The range for the binary gain of amplifier of FIG. 6, depending upon the binary numbers stored in register 131, is thus a total of 12DB. Such a decibel range is amply suitable to equalize the amount of amplitude distortion which is normally encountered in standard telephone communication links.

As mentioned hereinbefore the time required for an equalizing process is dependent upon the particular sequence established by the program sequencer 190, FIG. 1A. An automatic timer is included in the program sequencer, which timer monitors the time between an initiation of the equalizing process to the time when each section is stabilized at its lowest setting. Normally, the total equalization time involved is in the order of a minute or two.

If a given line is not equalized at the end of a fixed time limit, say in the order of 3 or 4 minutes, then the particular telephone line is faulty and cannot be equalized. After this time limit expires, the timer in the program sequencer 190 times out. Such a time-out triggers an alarm of any suitable type to indicate that the selected line cannot be equalized. Upon establishment of such an indication, a new telephone line is selected and that new line is then equalized by the operation described herein.

The subject invention has been described with reference to certain preferred embodiments; it will be understood by those skilled in the art to which this invention pertains that the scope and spirit of the appended claims should not necessarily be limited to the embodiments described in detail herein.

What is claimed is:

1. An automatic equalizer for equalizing a communication link having a given bandwidth, said equalizer comprising:

means for receiving test signals transmitted over said link which signals have a repetitive sequence of modulation periods including phase modulated signals having a known analog signal shape including a minimum amplitude at predetermined points of said modulation periods when received over a communication link that is phase and amplitude equalized;

a plurality of variable amplitude and variable delay sections centered at assigned frequencies located at frequency intervals across said bandwidth, each of said sections having variable signal conditioning characteristics at said assigned frequencies in response to electrical control signals;

means for sampling the amplitude of said test signals at said predetermined points of said modulation periods for at least two different test signals received over said link and passed through said plurality of sections; and means connected between said sampling means and the plurality of amplitude and delay sections and responsive to the relative magnitude of samples from said test signals for delivering electrical control signals to said sections, which control signals vary the amplitude and/or delay signal conditioning characteristics thereof at said assigned frequencies.

2. An automatic equalizer in accordance with claim 1 wherein said electrical control signal means comprises:

a binary control counter for each of said sections for delivering variable content binary signals thereto.

3. An automatic equalizer in accordance with claim 2 wherein each of said amplifier sections comprises:

a binary gain amplifier having a different amplitude setting associated with different content binary signals; and means connecting said binary gain amplifier to a control counter assigned thereto.

4. An automatic equalizer in accordance with claim 1 wherein said sampling means comprises:

means for storing individual amplitude samples from said test signals, said equalizer further comprising:

means for diminishing each of the stored amplitude samples to a predetermined level by a series of metered electrical amounts; and means connected to said diminishing means for counting the total number of metered amounts required to diminish each sampled amplitude of a series of amplitudes from a test signal.

5. An automatic equalizer in accordance with claim 4 wherein said sample storing means comprises:

a sample gate connected to receive a signal passed through said plurality of sections;

a storage capacitor connected to said sample gate; and timing means for enabling said sample gate to pass a signal to said storage capacitor at said predetermined points of said modulation periods.

6. An automatic equalizer in accordance with claim 5 wherein said diminishing means comprises:

a current source poled to deliver current in opposition to charges representative of said sampled amplitudes and stored in said storage capacitor;

a switching device connected between said current source and said storage capacitor; and means for repetitively enabling and disabling said switching device.

7. An automatic equalizer in accordance with claim 6 wherein said enabling and disabling means comprises:

an oscillator circuit for delivering enabling and disabling signals to said switching device.

8. An automatic equalizer in accordance with claim 7 wherein said means for counting the total number of metered amounts comprises:

an accumulator connected to said oscillator for storing pulses indicative of the number of signals applied therefrom to said switching device for each amplitude sample in a given test signal.

9. An automatic equalizer in accordance with claim 8 and further comprising:

a second accumulator for receiving and storing the oscillator pulses associated with a diminishing operation from a second test signal; and means for comparing the number of counts in said first and second accumulators.

10. An automatic equalizer in accordance with claim 9 wherein said comparing means comprises:

means for emitting a control signal whenever the number of counts in said first accumulator is greater than the number of counts in said second accumulator; and means for applying said control signal to one of said binary control counters to change the binary content thereof.

11. An automatic equalizer in accordance with claim 1 wherein said bandwidth of said link has a passband defined as (1/T) $H_z$ and having a center frequency of $f_o$ where:

T is the modulation period, $f_o$ is the carrier signal frequency; and $H_z$ is cycles per second.

12. An automatic equalizer for equalizing a communication link having a given bandwidth, said equalizer system comprising:

means for receiving a plurality of test signals transmitted over said link, each signal having a repetitive sequence of modulation periods and a known analog signal shape including a minimum amplitude at predetermined points of said modulation periods when received over a communication link that is phase and amplitude equalized;

a plurality of variable amplitude and variable delay sections centered at assigned frequencies substantially across said bandwidth, each of said sections having variable signal conditioning characteristics responsive to electrical control signals which vary the amplitude and/or delay characteristics thereof;

a plurality of control counters, one each for each amplitude and each delay section for delivering control signals to said sections;

means for obtaining an accumulated sample of the amplitude of each of said plurality of test signals at said predetermined points of said modulation periods thereof;

sequence control means for selectively actuating the control counters of individual amplitude and individual delay sections in a predetermined sequence at said assigned frequencies at which said sections are centered; and means connected to said sampling means and to the plurality of amplitude and delay sections and responsive to the relative magnitude of accumulated samples from two successive test signals for advancing or retarding the counters selected by said sequence control means.

13. An automatic equalizer for equalizing a communication link having a given bandwidth, said equalizer system comprising:

means for receiving test signals transmitted over said link which signals have a repetitive sequence of modulation periods and a known analog signal shape including a minimum amplitude at predetermined points of said modulation periods when received over a communication link that is phase and amplitude equalized;

a plurality of variable amplitude and variable delay sections centered at assigned frequencies located at frequency intervals across said bandwidth, each of said sections having variable signal conditioning characteristics in response to electrical control signals;

means for sampling the amplitude of said test signals at said predetermined points of said modulation periods for at least two different test signals received over said link and passed through said plurality of sections;

means connected between said sampling means and the plurality of amplitude and delay sections and responsive to the relative magnitude of samples from said test signals for delivering electrical control signals to said sections, which control signals vary the amplitude and/or delay signal conditioning characteristics thereof, said electrical control signal means comprising a binary control counter for each of said sections for delivering variable content binary signals thereto, said equalizer system further characterized in that each of said amplifier sections comprises:

a binary gain amplifier having a different amplitude setting associated with different content binary signals;

means connecting said binary gain amplifier to a control counter assigned thereto;

said amplitude settings of each of said amplifiers are dependent upon the impedance as defined by a series of impedances connected between a point of reference potential and a gain controlling terminal of the amplifier;

a plurality of binary weighted impedances connected in parallel to said gain controlling terminal; and means associated with the stages of said control counter for connecting selected impedances to said reference potential when bits of one type are stored therein and for providing an open circuit for selected impedances to said reference potential for bits of another type stored in said counter stages.

14. An automatic equalizer for equalizing a communication link having a given bandwidth, said equalizer system comprising:

means for receiving test signals transmitted over said link which signals have a repetitive sequence of modulation periods and a known analog signal shape including a minimum amplitude at predetermined points of said modulation periods when received over a communication link that is phase and amplitude equalized;

a plurality of variable amplitude and variable delay sections centered at assigned frequencies located at frequency intervals across said bandwidth, each of said sections having variable signal conditioning characteristics in response to electrical control signals;

means for sampling the amplitude of said test signals at said predetermined points of said modulation periods for at least two different test signals received over said link and passed through said plurality of sections;

binary counter means connected between said sampling means and the plurality of amplitude and delay sections and responsive to the relative magnitude of samples from said test signals for delivering electrical control signals to said sections, which control signals vary the amplitude and/or delay signal conditioning characteristics thereof; said equalizer system further characterized in that each of said delay sections comprises:

a tuned circuit having different degrees of effectiveness associated with different content binary signals;

means connecting said tuned circuit to a control counter assigned thereto;

said degree of effectiveness of each of said tuned circuits are dependent upon the impedance as defined by a series of impedances connected between a point of reference potential and a resonant signal controlling terminal of the tuned circuit;

a plurality of binary weight impedance connected in parallel to said resonant signal controlling terminal; and means associated with the stages of said control counter for connecting selected impedances to said reference potential when bits of one type are stored therein and for providing an open circuit for selected impedances to said reference potential for bits of another type stored in said counter stages.

15. An automatic equalizer system for equalizing a communication link having a given bandwidth, said equalizer system comprising:

means for receiving test signals transmitted over said link which signals include a phase modulated carrier during a repetitive sequence of modulation periods as test signals having a known analog carrier signal shape, which known shape includes minimum amplitudes at predetermined points of adjacent ones of said modulation periods when the phase modulated test signals are received over a communication link that is substantially equalized for phase and amplitude;

means responsive to said minimum amplitudes of said phase modulated carrier signal for sampling said test signals at said predetermined point of said modulation period to obtain at least two different sample signals, the values of which are indicative of a required phase and/or amplitude equalization for said communication link;

a plurality of variable amplitude and variable delay sections centered at assigned frequencies located at predetermined frequency intervals across said bandwidth, each of said sections having variable signal conditioning characteristics at said assigned frequencies for said communication link when said sections are adjusted; and means connected between said sections and said sampling means and responsive to the relative value of said samples for emitting electrical control signals indicative of required adjustments in the amplitude and/or delay signal conditioning characteristics for predetermined ones of the sections at said assigned frequencies.

* * * * *